UNITED STATES PATENT OFFICE.

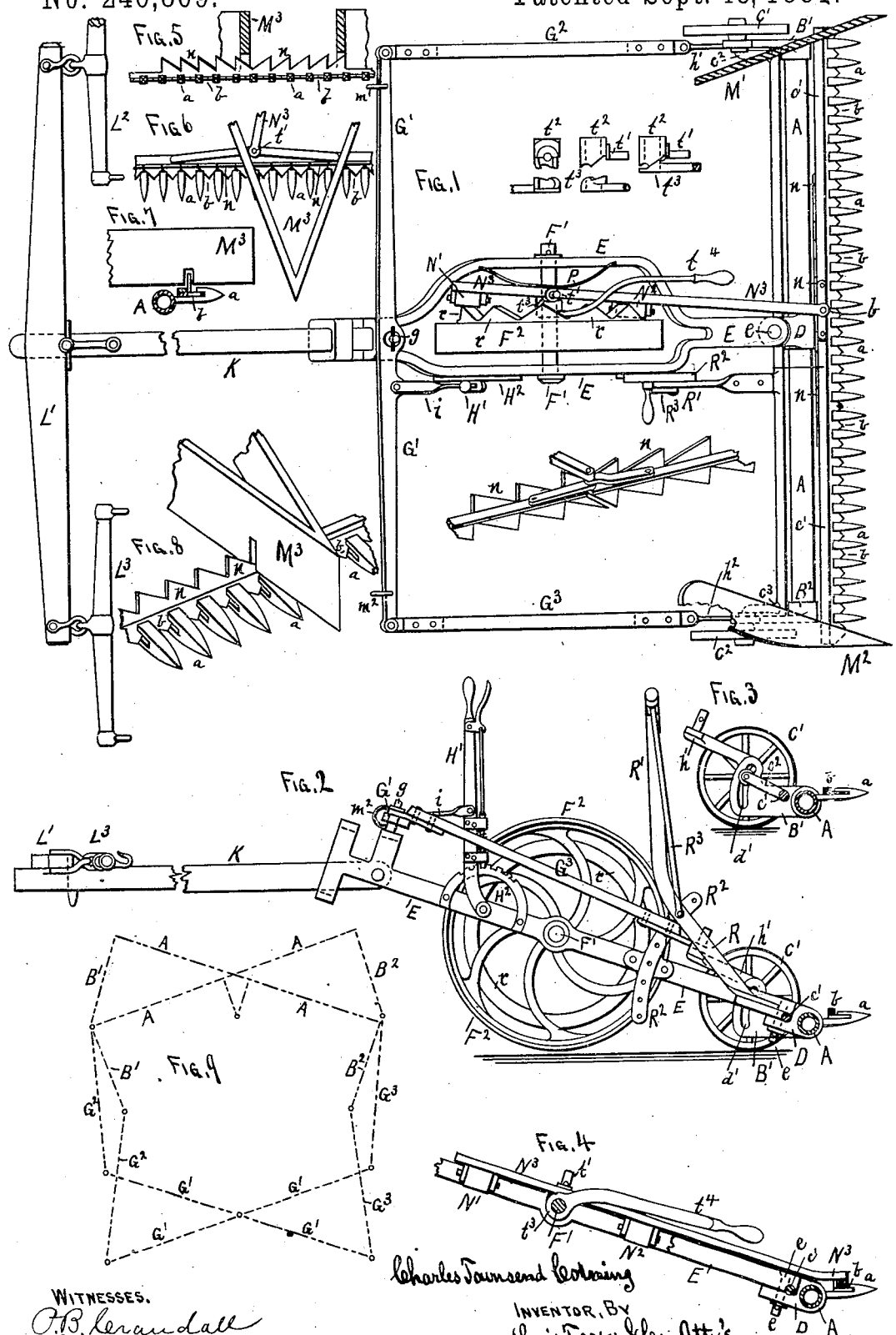

CHARLES T. CORNING, OF ST. PAUL, MINNESOTA.

MOWING-MACHINE.

SPECIFICATION forming part of Letters Patent No. 246,869, dated September 13, 1881.

Application filed March 11, 1881. (No model.)

*To all whom it may concern:*

Be it known that I, CHARLES TOWNSEND CORNING, a citizen of the United States, residing at St. Paul, in the county of Ramsey and State of Minnesota, have invented certain new and useful Improvements in Mowing-Machines, &c., of which the following is a specification.

My invention relates to mowing-machines, harvesters, and similar machines for cutting hay, grain, &c.; and it consists in a frame carrying a driving-wheel and pivoted at its lower end to the rear of the cutter-bar at or near its center, said cutter-bar being provided with grass or grain wheels at each end, so that it may be oscillated freely upon the frame to regulate the course in which the machine is to travel; and, also, in a double-ended lever or cross-bar connected by rods at its outer ends to the frames of the grass or grain wheels, whereby the oscillation of said lever will be communicated to the cutter-bar and a stiffening-frame produced for the cutter-bar, as hereinafter set forth.

The invention further consists in a series of inclined fingers arranged to project upward from the vibrated sickle and adapted to be moved therewith, to catch the hay or grain as it is cut and falls over the sickle and throw it away from the driving-wheel and other machinery, and thus act as a divider to prevent the clogging of the parts of the machine, as hereinafter set forth.

I accomplish these objects by the use of the mechanism illustrated in the accompanying drawings, in which—

Figure 1 is a plan view, and Fig. 2 is a side elevation, of the machine. Fig. 3 is a cross-section through the cutter-bar, showing the manner of arranging the grass or grain wheels and their frames, &c. Fig. 4 is a sectional view of the cutter-bar and drive-wheel frame, showing the manner of arranging them. Fig. 5 is a front view, Fig. 6 is a plan view, Fig. 7 is a side view, and Fig. 8 is a perspective view, of a portion of the center of the cutter-bar, sickle, &c., illustrating the manner of operating the inclined dividing-fingers, &c. Fig. 9 are dotted line diagrams of the outlines of the cutter-bar and steering-levers, showing their relative positions when the machine is being turned around or run in a curve.

A is the cutter-bar, formed in any desired manner, but preferably of gas-pipe, as shown, and having the guards $a$ and sickle $b$ arranged thereon. Upon either end of the cutter-bar frames $B'$ $B^2$ are secured, having a rod, $c'$, journaled at each end in them, and running along just in the rear of and parallel with the cutter-bar.

$d'$ $d^2$ are slots, adapted to receive the axles of two grass or grain wheels, $C'$ $C^2$, and made in a curve whose radius is the center of the rod $c'$, so that when the latter is connected to the axles of the wheels by arms $c^2$ $c^3$ and oscillated the cutter-bar will be raised and lowered, as hereinafter set forth.

D is a collar secured at or near the center of the cutter-bar, and having a projection on its rear, to which a frame, E, is pivoted at $e$, and running backward and upward at an angle and adapted to receive the axle $F'$ of a large driving-wheel, $F^2$.

Across the upper end of the frame E a long lever, $G'$, is pivoted at $g$, and with its outer ends connected by pivoted rods $G^2$ $G^3$ to arms $h'$ $h^2$ on the grass or grain wheel frames $B'$ $B^2$, and connected a short distance to one side of the center by a rod, $i$, to an adjustable hand-lever, $H'$, upon the frame E. By this arrangement, if the hand-lever $H'$ is pushed forward or backward the lever $G'$ will be oscillated upon its pivot $g$, and by means of the side levers, $G^2$ $G^3$, being connected to the frames $B'$ $B^2$, this motion will be communicated to the cutter-bar A and oscillate the latter upon its pivot $e$, thereby causing the wheels $C'$ $C^2$ to assume a position at an angle to the wheel $F^2$, so that when the machine is moved forward it will travel in a curve larger or smaller, according as the angle between the wheels is increased or decreased by adjusting the lever $H'$ upon the notched segment $H^2$, or by securing the lever $H'$ so that the three wheels $C'$ $C^2$ $F^2$ are parallel, when, of course, the machine will travel in a straight line. These different angles of the cutter-bar and levers are more clearly shown by Fig. 9, which represents the outlines of the cutter-bar A, frames $B'$ $B^2$, and levers $G'$ $G^2$ $G^3$ at their two opposite angles. By this manner of arranging the drive-wheel $F^2$ in the center the cutter-bar A tilts upon the frame E and wheel $F^2$ when running over uneven ground without wrenching or straining the machine, and without requiring loose or wrist joints.

K is the tongue, pivoted in the back end of the frame E, and having the usual single-tree $L'$ and whiffletrees $L^2$ $L^3$, to which the horses are attached, the single-tree being long enough so that the horses will walk in a line in the rear of the grass or grain wheels $C'$ $C^2$, the latter being provided with dividers $M'$ $M^2$ in the usual manner, so that the grass or grain will be thrown inward and leave clear spaces for the horses to walk in.

When a team of horses are traveling in a curve, or when turning around, one must travel a little faster than and a little in advance of the other, and to cause the horses attached to this machine to assume this relation when the machine is traveling in a curve, or when turning a corner, I connect each horse by its halter to rings $m'$ $m^2$ on the lever $G'$, so that when the latter is oscillated the horse on the outside of the curve will be led forward by the movement of the lever and thus made to assume his proper position slightly in advance of the other, as above described.

Attached to the center of the sickle, upon the rear of its upper edge, and arranged to project upward therefrom are a series of fingers, $n$, extending a short distance to either side of the collar D, with one side inclined and the other side perpendicular, (see Figs. 5, 6, 7, and 8,) the fingers on either side of the center or the collar D having their inclined sides running toward the collar, so that when the sickle is vibrated the inclined sides of the fingers will run under the falling hay or grain toward the center and not affect it; but when moved in the opposite direction the perpendicular sides of the fingers will catch the straws and move them to one side and leave them there, and thus divide the hay or grain at the center and turn it to either side and prevent its falling upon or beneath the frame E and wheel $F^2$. A V-shaped double-sided divider, $M^3$, will be attached over the center of the cutter-bar and sickle, through which the fingers $n$ run to assist the latter in dividing the hay or grain.

Attached to the side of the driving-wheel $F^2$ is a ring provided with an uneven number of cams, $r$, (eleven being shown,) adapted to act upon friction-rollers $N'$ $N^2$ upon a lever, $N^3$, pivoted at $t'$ to a loose collar, $t^2$, on the axle $F'$, the lower end of this lever $N^3$ being pivoted to the sickle $b$, so that the revolution of the cam-ring will oscillate the lever $N^3$, and thus vibrate the sickle.

P is a spring, arranged to press against the lever $N^3$ to keep the friction-rollers $N'$ $N^2$ in contact with the cam-ring at all points to prevent any unevenness or irregularity of the cams or rollers from affecting the motion, and also to take up any looseness caused by wear, &c., and prevent rattling.

The front of the collar $t^2$ will be made with an inclined side and adapted to be acted upon by a similar inclined side on another collar, $t^3$, provided with a hand-lever, $t^4$, the two collars with their inclined sides thus forming a clutch by which the lever $N^3$ and friction-rollers $N'$ $N^2$ may be thrown in and out of gear with the cams $r'$, and thus stop or start the sickle at pleasure.

$R'$ is a hand-lever, connected to the rod $c'$ and provided with a stationary perforated segment, $R^2$, and spring-catch $R^3$, whereby the rod $c'$ may be turned more or less and held at any desired point to raise and lower the cutter-bar A and hold it at any desired point of elevation.

The side levers, $G^2$ $G^3$, will be made stiff enough to both push and pull upon the arms $h'$ $h^2$ of the frames $B'$ $B^2$, so that they will not only act as levers to oscillate the cutter-bar upon its pivot $e$, but will also serve as supports to strengthen the cutter-bar.

A number of the fingers $n$ may be placed upon the cutter-bar at the ends with their inclined sides tending inward to throw the hay or grain away from the dividers $M'$ $M^2$ and assist them in their work. These fingers $n$, arranged as shown, are very important features of my invention as they greatly assist the dividers in their work, and, as arranged, are novel, so far as I am aware.

I am aware that such inclined fingers have have heretofore been used upon hay or grain cutting machines; but not, so far as I aware, arranged like mine or used for the same purpose.

The tilting of the machine upon the center wheel in running over rough or uneven ground is also an important feature of my invention, as it enables me to use the machine upon all qualities of land without altering any of the parts or wrenching or straining them.

What I claim as new is—

1. In mowing and similar machines, the cutter-bar pivoted at or near the center to a frame carrying a driving-wheel, whereby the said cutter-bar may be adjusted horizontally to enable the machine to be moved in any desired direction and adjust itself to uneven surfaces of the ground, substantially as set forth.

2. The combination and arrangement of the frame E, carrying the driving-wheel $F^2$, of the cutter-bar A and levers $G'$ $G^2$ $G^3$, substantially as set forth.

3. The cutter-bar A, having the frames $B'$ $B^2$ and grass or grain wheels $C'$ $C^2$ connected thereto, in combination with the frame E, pivoted at or near the center to the said cutter-bar and arranged to support the driving-wheel $F^2$, substantially as set forth.

4. The cutter-bar A, having the frames $B'$ $B^2$ and grass or grain wheels $C'$ $C^2$ attached to its outer ends, and frame E, carrying the driving-wheel $F^2$ and pivoted to the said cutter-bar at or near its center, in combination with the levers $G'$ $G^2$ $G^3$, substantially as set forth.

5. The combination, with the cutter-bar A, having the frame E pivoted to it at or near the center, of the fingers $n$, angular upon one side and perpendicular upon the other, and arranged with the angular sides of said fingers inclined away from the center upon either side, whereby the hay or grain may be divided as it falls over the sickle and turned to either side of the frame E, substantially as set forth.

6. The combination of the dividers $M'$, $M^2$, or $M^3$, sickle $b$, and fingers $n$, the latter being formed straight upon one side and inclined upon the other, with the inclined sides tending away from the dividers, substantially as set forth.

In testimony whereof I have hereunto set my hand in the presence of two subscribing witnesses.

CHARLES TOWNSEND CORNING.

Witnesses:
J. W. L. CORNING,
LOUIS FEESER, Sr.